United States Patent [19]

Calcagno et al.

[11] 3,843,619
[45] Oct. 22, 1974

[54] PROCESS FOR POLYMERIZING OLEFINS
[75] Inventors: Benedetto Calcagno, Milan; Paolo Colombo, Saronno, both of Italy
[73] Assignee: Societa Italiana Resine S.I.R. S.p.A., Milan, Italy
[22] Filed: Aug. 10, 1972
[21] Appl. No.: 279,404

Related U.S. Application Data
[63] Continuation-in-part of Ser. No. 864,539, Oct. 7, 1969, abandoned.

[30] Foreign Application Priority Data
Oct. 12, 1968  Italy.............................. 845194/68

[52] U.S. Cl. ... 260/94.9 C, 252/429 B, 260/88.2 R, 260/93.5 S, 260/93.7
[51] Int. Cl. ............................................. C08f 1/56
[58] Field of Search ...................... 260/88.2, 94.9 C

[56] References Cited
FOREIGN PATENTS OR APPLICATIONS
1,598,869  7/1970  France
1,128,090  9/1968  Great Britain Primary Examiner—Edward J. Smith
Attorney, Agent, or Firm—Sughrue, Rothwell, Mion, Zinn and Macpeak

[57] ABSTRACT

A process for polymerizing olefins, particularly ethylene, is disclosed which utilizes a mixed catalyst system of the Zeigler type containing a reduced amount of transition metal compound in order to alleviate contamination of the polymer produced, and also containing certain types of unsaturated ketones which permits the reduction of the amount of the transition metal compound while increasing the activity of the catalyst.

3 Claims, No Drawings

PROCESS FOR POLYMERIZING OLEFINS

CROSS-REFERENCE TO RELATED APPLICATIONS

The present application is a continuation-in-part of earlier copending application Ser. No. 864,539, filed Oct. 7, 1969, and now abandoned.

BACKGROUND OF THE INVENTION

1. Field of the Invention

This invention relates to the polymerization of ethylene particularly, and generally, olefins, and is primarily concerned with a new type of catalyst that can be used for the purpose.

2. Description of the Prior Art

In the present state of the art, use is made of various kinds of catalysts, and in particular of those commonly known as "Ziegler catalysts." They use a combination of at least two different compounds, namely a compound of a transition metal and an organo-metallic compound, the metal being chosed from among these belonging to particular groups in the periodic table.

However, the use of such catalysts has various drawbacks, especially on account of the difficulty experienced in separating the catalytic residues from the olefin (e.g., ethylene) polymer.

The polymer in fact must be thoroughly purified upon completion of polymerization, since the catalytic residues, especially those of transition metals, have an adverse effect on the product, altering its chemico-physical properities and more particularly its mechanical characteristics and applications. Purification is all the more awkward in the case of Ziegler catalytst because these contain rather larger amounts of transition-metal compounds, and it is difficult to reduce their concentration to levels such as not to interfere with the properties of the polymer itself.

A need has therefore been felt for other types of catalysts for use in polymerizing olefins, having as low a content as possible of transition metals, so as to simplify and cheapen the process of purifying the polymer after polymerization.

It has been found that this can be achieved by the process here proposed for the polymerization of olefins, which provides for the use of catalysts which are highly active, but which contain only traces of compounds of transition metals.

British Pat. No. 1,128,090 discloses a process for polymerizing, e.g., propylene, to produce highly crystalline polymers using a mixed catalyst system consisting of a transition metal halide, an organometallic compound of Groups I, II or III and an α, β-ethylenically unsaturated compound (such as mesityl oxide). The proportion of the latter component of the catalyst may vary from 0.001 to 2 moles per mole of the transition metal halide. It is disclosed therein that poisoning of the catalayst occurs, thus decreasing the polymerization efficiency, when the molar ratio of the α, β-ethylenically unsaturated compound to titanium trichloride (the preferred transition metal halide) exceeds the above range.

SUMMARY OF THE INVENTION

Specifically, the catalysts used in the present process contain the following:

a. an organic compound containing in its molecule at least one grouping consisting of a ketone group in the alpha position in relation to a carbon bearing an ethylenic unsaturation, said compound being referred to as nonsaturated ketone, throughout this specification, and being selected from the group consisting of mesityl oxide, phorone, isophorone and indigo.

b. An organo-metallic compound of a metal of groups IIb and IIIb of the periodic table.

c. A trace of a compound of a transition metal of groups IVa, Va, VIa, VIIa and VIII of the periodic table. More particularly, the transition metals can, for example, be used in the form of salts of inorganic and organic acids or in the form of complexes, the metal being at its maximum valency or one degree of valency below.

DESCRIPTION OF THE PREFERRED EMBODIMENTS

The salts of transition metals to be preferred include halides and oxyhalides, and in particular chlorides and oxychlorides, such as, for example, titanium tetrachloride, titanium trichloride, vanadium chlorides and oxychlorides and the chlorides of molybdenum, chromium, nickel and cobalt. For the polymerization of ethylene, titanium tetrachloride is especially preferred.

The molar ratio between the transition-metal compound and the other ingredients of the catalyst should preferably be maintained at between 1:50 and 1:117.

Particularly where the polymerization of the olefins is carried out in the presence of solvents and in the manner described hereunder, the transition-metal compound is preferably used in concentrations of from 0.01 to 10.0 millimoles per litre of solvent.

Particularly preferred organometallic compounds are the organo-aluminum compounds of the formulae:

$$Al\ R_n\ X_{3-n} \text{ and } Al_2R_3X_3$$

wherein R represents a hydrocarbon radical of 1 to 8 carbon atoms such as alkyl, aryl, cycloalkyl and aralkyl groups; X represents a halogen atom or an alkoxy group and $n$ is 1, 2 or 3.

Among the above aluminum alkyls and halides thereof, preferred for the purposes of the present invention are, for example, aluminum triethyl, aluminum tri-isobutyl, diethyl aluminum monochloride, aluminum ethyl sesquichloride and aluminum tri-isopropyl.

The catalysts in the present invention preferably contain the organo-aluminum compound in such a quantity as to give a molar ratio of organo-aluminum compound to the non-saturated ketone of from 1.3:1 to 2:1.

The way in which the constituents of the catalyst are brought into contact is not critical. However, in one form of the invention, the transition-metal compound is added to the non-saturated ketone at a working temperature of between −10° and 100° C. and preferably between 20° and 70° C. It is preferable to operate in the presence of an inert organic solvent such as, for example, paraffin, an aromatic hydrocarbon, a halogenated paraffin or halogenated aromatic hydrocarbon, etc., i.e., a solvent that is liquid in the operating conditions (i.e., from 10° to 100° C.).

To the mixture so obtained is added the organo-metallic compound, which may be dissolved in the paraffin or aromatic solvent, halogenated or not, still at a working temperature of from −10° to 100° C. and preferably from 20° to 70°C.

Another possibility is for the organo-metallic compound to be added to the non-saturated ketone first, and then the transition-metal compound, the temperature conditions defined above still be observed.

The catalysts here proposed are very active in the polymerization of olefins and especially in the production of ethylene polymers.

It is also possible to polymerize propylene and the higher olefins, and alpha olefins in particular, as also vinyl aromatics such as styrene and alpha methyl styrene.

Finally, olefin copolymers can also be prepared, such as, for instance, ethylene-propylene copolymers.

In the polymerization of ethylene, the ethylene gas is added to the catalysts described above, preferably at temperature levels beteween −10° and 80° C. and at a pressure of 1 to 40 atmospheres and preferably from 10 to 15 atmospheres.

Polymerization should preferably be carried out in the presence of an inert organic solvent that is liquid in the operating conditions, such as paraffin hydrocarbons such as hexane or heptane, or aromatic hydrocarbons such as benzene and toluene, or halogenated paraffin hydrocarbons such as ethyl chloride, butyl bromide or dichloro-ethane, or again, halogenated aromatic hydrocarbons such as monochloro-benzene.

When polymerization is complete, the polymer may be treated with an alcohol or ketone solvent for elimination of the catalyst.

The preferred procedure, however, is to recover the catalyst from the polymer suspension. To do this, the suspension is diluted with the same solvents as used for polymerization, filtration is applied and the polymer is washed in an atmosphere of nitrogen or other inert gas.

In this way, the major portion of the catalyst is recovered and can be re-cycled to the polymerization stage, while at the same time the polymer obtained is sufficiently pure for the purposes for which it is normally used.

Even though not essential, a higher degree of purity can be obtained by subsequently treating the polymer with an organic solvent of the alcohol type, such as methanol, or the ketone type, such as acetone to remove residual traces of the catalyst.

After the purification treatment, the polymers are dried. Purification is particularly simple, since the residue of transition-metal in the polymer after the completion of polymerization is present in an amount of the order of only a few parts per million and hence in quantities less than what would constitute a threat to the properties of the polymer.

By the process here proposed, one can obtain olefin polymers in quantities of 100 to 250 grams or more for every gram of catalyst, while the amounts of olefin polymer in relation to the transition-metal compound may vary from 2,000 to 30,000 or more parts by weight polymer to 1 part by weight of the transition-metal.

Ethylene polymers obtainable by the inventive process have a melting point above 130° C. and densities of between 0.960 and 0.980 g./c.c.

In particular, structural analyses have shown that these ethylene polymers possess a linear structure with a content of methyl groups of less than 1 to every 1,000 carbon atoms, while the non-saturations amount in all to a maximum of 0.2 to every 1,000 carbon atoms in the polymer.

The following examples will serve to illustrate the invention without limiting the same.

EXAMPLE 1

A stainless-steel autoclave fitted with a heat-exchange jacket, agitator, pressure gauge and thermometer tube was charged with 1,500 c.c. of benzene containing 7.6 m moles of indigo and 0.3 m moles of $VOCl_3$.

At a temperature of 30° C., 500 c.c. of a solution consisting of 16 m mols of ethyl aluminum sesquichloride in benzene was introduced into the autoclave, in which a nitrogen atmosphere had been provided.

While the temperature was maintained at 30° C., ethylene gas was admitted until the pressure in the autoclave was 12 atmospheres, this pressure being maintained by the continuous admission of ethylene for a period of 5 hours. At the end of that period, the reaction products were discharged and the solid polymer was treated with a little methanol to remove active catalyst residues.

Extraction was then carried out with boiling methanol, using 80 c.c. of alcohol to every 100 parts of polymer, and the operation was continued for 4 hours.

In this way, 354 g. of a white polymer (i.e., polyethylene) was obtained, having the following characteristics:

| | | |
|---|---|---|
| Melting point | – | 130°C. |
| Density | – | 0.962 g./c.c. |

Polymer was produced in an amount of over 7,000 parts by weight polymer per 1 part by weight of vanadium.

EXAMPLE 2

Using the equipment described in Example 1 and adopting the same procedure as in that example, the reaction vessel was charged with 1,500 c.c. of heptane containing 15 m mols of iso-phorone and 0.3 m mols of titanium tetrachloride. Then 500 c.c. of heptane containing 20 m mols of ethyl aluminum sesquichloride was admitted to the vessel.

While this was being done and during the polymerization that followed, the temperature was maintained at 20° C.

Ethylene was fed in until the pressure was 12 atmospheres, at which level it was maintained for the next 5 hours.

The polymer was recovered from the suspension by filtration in nitrogen and washing with anhydrous heptane.

In this way, a heptane solution was obtained which contained the major part of the catalyst, which could be re-used, as well as 348 g. polymer which had the following characteristics after drying:

| | | |
|---|---|---|
| Melting point | – | 133°C. |
| Density | – | 0.970 g./c.c. |

EXAMPLE 3

This example demonstrates, that by employing the ketone additive of the present invention in the amounts described, good results are obtained even when the less active (compared to the titanium and vanadium halides) nickel chloride is employed.

The equipment described in the first example was used and the procedure followed was as described therein. The autoclave was charged with 2,000 c.c. of benzene, 0.6 m mols of nickel chloride, 10 m mols of indigo and 20 m mols of aluminum triethyl.

Using a temperature of 30°C., ethylene was fed in up to a pressure of 11 atm., this being continued and the pressure maintained at that level for 4 hours.

Then the polymer was recovered as in Example 1, the yield being 35.2 g. of a product having the following characteristics:

Melting point — 131°C.
Density — 0.966 g./c.c.

EXAMPLE 4

The equipment described in the first example was used and the procedure followed was as described therein, the initial charge being 2,000 c.c. of benzene, 0.3 m mols of titanium tetrachloride, 15 m mols of mesityl oxide and 20 m mols of aluminum triethyl.

Then a gas mixture consisting of ethylene (95 percent by volume) and propylene (5 percent by volume) was fed in, up to a pressure of 12 atmospheres.

During polymerization, the temperature was maintained at 25°C. and the pressure was maintained at the stated level by the separate admission of ethylene and propylene in the requisite proportions.

At the end of the experiment, after 5 hours, 255 grams of a white ethylene/propylene copolymer was recovered. On analysis, this showed a propylene content of 2.4 percent by weight. Other properties of the polymer were:

Melting point — 133.5°C.
Density — 0.965 g./c.c.

EXAMPLE 5

Ethylene was polymerized by operating substantially under the conditions of Example 7 of British Pat. No. 1,128,090. To a stainless steel autoclave provided with a magnetic stirrer was charged, at a temperature of 60°C., 250 milliliters of n-heptane and subsequently, in the recited order, 0.6 grams of diethyl aluminum chloride, mesityl oxide and 0.3 grams of titanium trichloride, the amount of mesityl oxide being such that the molar ratio of mesitiyl oxide to titanium was 0.3 (within the 0.001 to 2:1 range taught by the British Patent). The molar ratio of aluminum to titanium was 2.56 (withint the preferred range of the British patent of 2 to 5:1). Polymerization was performed at a pressure of 4 kilograms per square centimeter by continuously admitting ethylene to the autoclave during a 3 hour period. The resulting product was washed, after separation, by filtering off the reaction solvent, with n-heptane containing isobutanol, then filtered and dried. 63 grams of polymer per gram of titanium per hour were obtained.

EXAMPLE 6

The procedure of Example 5 was duplicated using a catalyst composition of the present invention. As in Example 5, n-heptane was charged to the autoclave followed by diethyl aluminum chloride, mesityl oxide and titanium tetrachloride, in amounts indicated in the following Table 1, different amounts being used in the three different runs shown in the following Table:

Table 1

|  | Run A | Run B | Run C |
| --- | --- | --- | --- |
| n-heptane (ml) | 250 | 250 | 250 |
| Ti Cl$_4$(g.) | 0.007 | 0.007 | 0.007 |
| mesityl oxide/Ti(molar) | 20/1 | 30/1 | 40/1 |
| Al/mesityl oxide(molar) | 2/1 | 1.34/1 | 1.87/1 |
| Ti/Al + mesityl oxide(molar) | 1/60 | 1/70 | 1/115 |
| g.polymer/g. Ti/hour-atm. | 520 | 540 | 490 |
| melting point (°C.) | 131 | 131 | 130 |
| N(n) | 3.9 | 2.3 | 0.9 |
| M$\bar{w}$/M$\bar{n}$ | 3.84 | 4.17 | 1.22 |

It is seen that the mesityl oxide/titanium molar ratios in Runs A, B and C in Table 1 are substantially higher than the ratio shown in Example 5 and also exceed the maximum 2:1 molar ratio taught by the British Patent. However, the catalyst activity of the catalyst system shown in Table 1 is very superior to that of the catalyst used in Example 5, resulting in a minimum of almost eight times as much polymer and a maximum of about nine times as much polymer per unit weight of titanium per hour. The very low amount of titanium catalyst employed in the above runs lessens the possibility of contamination of the product while at the same time achieving a very high activity.

EXAMPLE 7

Ethylene was polymerized using the two additives shown in Table 2 below which are outside the scope of the present invention but are α, β-ethylenically unsaturated compounds. The conditions of polymerization were the same as in Example 5, with the catalyst composition being shown in the following Table 2 as well as the amount of polymer produced.

Table 2

| Additive | Acrolein | methyl acrylate |
| --- | --- | --- |
| n-heptane (ml.) | 250 | 250 |
| TiCl$_4$(g.) | 0.007 | 0.007 |
| additive/Ti(molar) | 20/1 | 20/1 |
| Al/additive(molar) | 2/1 | 2/1 |
| Ti/Al + additive (molar) | 1/60 | 1/60 |
| g.polymer/g. Ti/hour-atm. | 93 | 81 |

Although the above ratios of additive to titanium are within the range of the catalyst composition of the present invention, a very low amount of polymer per unit weight of titanium per hour is obtained as compared to the results using the catalysts of the present invention as shown in Table 1.

What is claimed is:

1. In a process for the polymerization of ethylene comprising polymerizing ethylene at a temperature of from −10° to 80°C. at a pressure of from 1 to 40 atmospheres in the presence of a solvent selected from the group consisting of paraffin hydrocarbons, aromatic hydrocarbons, halogenated paraffin hydrocarbons and halogenated aromatic hydrocarbons, said solvent being liquid under the conditions of polymerization, and in the presence of a catalyst containing an organometallic compound and a compound of a transition metal, the improvement comprising conducting the polymerization using a catalyst consisting essentially of:

a. an organic compound containing in its molecule at least one ethylenically alpha-unsaturated keto group, said organic compound being indigo;
b. ethyl aluminum sesquichloride; and
c. vanadium oxychloride, the molar ratio between said vanadium oxychloride and said indigo plus said ethyl aluminum sesquichloride being 1/78.7, and the molar ratio between said ethyl aluminum sesquichloride and said indigo being 2.1/1.

2. In a process for the polymerization of ethylene comprising polymerizing ethylene at a temperature of from −10° to 80°C. at a pressure of from 1 to 40 atmospheres in the presence of a solvent selected from the group consisting of paraffin hydrocarbons, aromatic hydrocarbons, halogenated paraffin hydrocarbons and halogenated aromatic hydrocarbons, said solvent being liquid under the conditions of polymerization, and in the presence of a catalyst containing an organometallic compound and a compound of a transition metal, the improvement comprising conducting the polymerization using a catalyst consisting essentially of:

a. an organic compound containing in its molecule at least one ethylenically alpha-unsaturated keto group, said organic compound being iso-phorone;
b. ethyl aluminum sesquichloride; and
c. titanium tetrachloride, the molar ratio between said titanium tetrachloride and said iso-phorone plus said ethyl aluminum sesquichloride being 1/117, and the molar ratio between said ethyl aluminum sesquichloride and said iso-phorone being 1.3/1.

3. In a process for the polymerization of ethylene comprising polymerizing ethylene at a temperature of from −10° to 80°C. at a pressure of from 1 to 40 atmospheres in the presence of a solvent selected from the group consisting of paraffin hydrocarbons, aromatic hydrocarbons, halogenated paraffin hydrocarbons and halogenated aromatic hydrocarbons, said solvent being liquid under the conditions of polymerization, and in the presence of a catalyst containing an organometallic compound and a compound of a transition metal, the improvement comprising conducting the polymeriziation using a catalyst consisting essentially of:

a. an organic compound containing in its molecule at least one ethylenically alpha-unsaturated keto group, said organic compound being indigo;
b. aluminum triethyl; and
c. nickel chloride, the molar ratio between said nickel chloride and said indigo plus said aluminum triethyl being 1/50, and the molar ratio between said aluminum triethyl and said indigo being 2.0/1.

* * * * *